United States Patent
Shinoda et al.

(10) Patent No.: US 6,811,157 B2
(45) Date of Patent: Nov. 2, 2004

(54) METALLIC GASKET FOR VACUUM DEVICE AND METHOD OF PRODUCING THEREOF

(75) Inventors: Satsuo Shinoda, Kanagawa-ken (JP); Satoshi Kurokochi, Tokyo (JP)

(73) Assignee: Vacs SEV Co., Ltd., Tokyo (JP)

( * ) Notice: Subject to any disclaimer, the term of this patent is extended or adjusted under 35 U.S.C. 154(b) by 175 days.

(21) Appl. No.: 10/192,083

(22) Filed: Jul. 10, 2002

(65) Prior Publication Data

US 2003/0011143 A1 Jan. 16, 2003

(30) Foreign Application Priority Data

Jul. 11, 2001 (JP) .......................... 2001-211354
May 20, 2002 (JP) .......................... 2002-145484

(51) Int. Cl.[7] .............................................. F16L 17/06
(52) U.S. Cl. ...................... 277/608; 277/602; 277/614; 277/616; 277/626
(58) Field of Search ................................ 277/602, 608, 277/614, 616, 626

(56) References Cited

U.S. PATENT DOCUMENTS

| | | | | |
|---|---|---|---|---|
| 3,208,758 A | * | 9/1965 | Carlson | 277/638 |
| 3,263,025 A | * | 7/1966 | Wheeler | 174/151 |
| 4,261,584 A | * | 4/1981 | Browne et al. | 277/647 |
| 4,616,860 A | * | 10/1986 | Faria et al. | 277/614 |
| 5,433,454 A | * | 7/1995 | Ramberg | 277/643 |
| 5,630,592 A | * | 5/1997 | Obara et al. | 277/614 |
| 5,640,751 A | * | 6/1997 | Faria | 29/525.02 |
| 5,700,014 A | * | 12/1997 | Morita et al. | 277/614 |

OTHER PUBLICATIONS

Handbook of Vacuum Science & Technology, Academic Press,pp. 420,481.
MDC Company website pp. 1,2 and 3.(Apr. 30, 2002).
Catalog page extract of Lesker Company.
Extract of Newspaper published Apr. 8, 1997 by The Kikkan Kogyo Shimbun, Ltd.

* cited by examiner

*Primary Examiner*—Anthony Knight
*Assistant Examiner*—E Peavey
(74) *Attorney, Agent, or Firm*—Duane Morris LLP

(57) ABSTRACT

A gasket made of nickel, nickel alloy or stainless steel has a sealing face to be engaged by a knife-edge of a joint part. The gasket is cut to form a concave groove, a stepwise reduction in thickness or a sloping cut-out at the sealing face. The sealing face is protected from contact by an adjacent higher land portion. During processing, the gaskets can be stacked or carried on a rest. Any contact occurs at the land portion rather than at the sealing faces, which are protected by the land portions from contact. Dents or scratches in the sealing faces are prevented.

6 Claims, 9 Drawing Sheets

(a)

(b)

(a)

(b)

(a)

(b)

(a)

(b)

(c)

(a)

(b)

(c)

METALLIC GASKET FOR VACUUM DEVICE AND METHOD OF PRODUCING THEREOF

BACKGROUND OF THE INVENTION

This invention relates to vacuum devices as used for semiconductor equipment, such as thin film producing or etching units, and also can be used in other electronic, optical and experimental units. A metallic gasket is provided for use in a joint that connects parts of a vacuum vessel with a member, such as a viewing port, or for connecting such parts with each other, and achieving a vacuum state. The invention also relates to a method for producing the same.

In general, a gasket for a joint in a vacuum device comprises an elastomer, such as rubber, or a metal. A gasket made of elastomer may be feasible due to improvements in the quality of rubber for withstanding vacuum. However, a gasket made of metal is also used in many cases, such as where there are issues with airtightness at ultra high vacuum, high temperature conditions, or problems from gas that may be evolved from a gasket made of elastomer.

A metallic gasket can be generally shaped as a plate with the shape of a rectangle in cross section. As shown in FIG. 7($a$), a gasket in the shape of a plate $1_1$ is held between a pair of joint parts $2_1$ and $2_2$ forming a vacuum barrier, each having a flange $2a$ and an annular knife-edge $2b$. Bolts 3 are inserted into a number of holes $2c$ around flange $2a$, and tightened with nuts 5, so that the knife-edges $2b$ bite into both sides $1a$, $1a$ of the plate-shaped gasket $1_1$. The joint parts $2_1$ and $2_2$ are joined to each other by the gasket, maintaining the airtight barrier.

Alternatively, as shown in FIG. 7($b$), a gasket $1_2$ having a cross section in the shape of a rectangle is held between a pair of vacuum joint parts $2_1$ and $2_2$, each having a flange $2a$, a tapered face $2d$ broadening the opening diametrically outward, and a vertical face $2e$ at the outside diameter end. As above, the joint parts are fastened with bolts 3 and nuts 5, such that a tapered face $2d$ abuts on a corner portion $1c$ against gasket $1_2$. The corner portion $1c$ is crushed, holding the gasket $1_2$ between the tapered face $2d$ and the vertical face $2e$. The gasket thus connects joint parts $2_1$ and $2_2$, holding airtightness.

Airtightness is maintained from squeezing deformation against both opposite faces of the gasket by knife-edges $2b$, applied against the plate shaped metallic gasket $1_1$, and by squeezing deformation at the corner portion $1c$ of the gasket from the tapered face $2d$ of gasket $1_2$. Generally, the metallic material of the gasket is copper, and aluminum may be also used.

A vacuum joint 2 that can be baked, having a knife-edge $2b$ or tapered face $2d$ (generally called a "Con Flat flange" where "Con Flat" is a trademark) can be used in combination with a gasket made of oxygen-free copper. This material is advantageous in that oxygen-free copper deforms with pressure to an extent that can be matched to the strength and pressing force applied at flange $2a$, owing to the number of the bolts 3, with good results.

A desirable gasket in modern applications should endure heating of 200 to 450°, which is a generally applicable range of baking temperatures in ultra high vacuum equipment. The gasket should be corrosion resistant in a reducing atmosphere including a halogen or the like, as appropriate in some thin film producing processes. Furthermore, the desired gasket should endure use in an even more corrosive atmosphere, wherein process gas such as NFn and free ions exist, for example as typical of in-situ cleaning by an etching processing unit during semiconductor production. In such a case, nickel, its alloy or stainless steel, having high corrosion resistance and high heat resistance, is preferred material.

Experiments were made by the present inventors, using a gasket made of nickel, nickel alloy or stainless steel on the above-mentioned vacuum joints. Compared to a conventional gasket made of oxygen free copper, it was found to be difficult to maintain sufficient airtightness in a gasket made of nickel or the like, having an annular plate shape and a rectangular shape in section, and having a constant thickness. Moreover, it was found to be difficult to get sufficient airtightness even in an experiment with a nickel gasket having a surface ground to a mirror finish or one with a nickel base, coated with gold or silver.

FIG. 8($a$) shows a magnified area of a gasket surface $1a$ and an abutting face $2j$ of a joint member 2, the joint member being shown schematically. As shown in FIG. 8($b$), in case of the gasket made of oxygen free copper $1cu$, the abutting face $2j$ of the joint member and the gasket surface $1a$ have been brought against one another in such a manner that the abutting face $2j$ of the joint is pressed against the gasket surface $1a$. The respective high portions of the gasket (convex portions) a, b, c, d . . . independently bear against the abutting face $2j$ and are squeezed and deformed, so that the lower portions (concave portions) m, n, o, p . . . become confined below the abutment surface. By comparison as shown in FIG. 8($c$), in case where the gasket is made of material that is less deformable by such pressure, such as nickel (and its alloy, stainless steel) $1ni$, the high portions (convex portions) a, b, c, d are only slightly squeezed when supporting a comparable load. The whole gasket surface deforms, as opposed to the high points. Although pressure is applied across the whole gasket surface, the fine variations in the gasket surface substantially retain their uneven shape.

On the basis of these results, the inventors reasoned that if a flaw x, such as a scrape, a scratch or a dent, is formed on the surface $1a$ of a metallic gasket during production, transportation or storage (see FIG. 9($a$)), the flaw x can be compensated (x') if the gasket has sufficient malleability as in the case of a gasket made of oxygen free copper $1cu$, shown in FIG. 9($b$). Deformation of the gasket material by a knife-edge $2b$ (or a tapered face) in that case maintains airtightness. In the case of a gasket made of less malleable nickel (and its alloy, and stainless steel) $1ni$, however, a flaw x" remains and can result in communication between an inside and an outside of the vacuum device. Even if the pressure from bolts 3 is increased to a large pressing force, the result is to depress the surface including the flaw x, with deformation as shown in FIG. 9($c$). The joint may fail to prevent communication. In the respective views of FIGS. 9($a$)–9($c$), the flaws x, x" are exaggerated. In general, a flaw x" of FIG. 9($c$) is not on the plane of a cross section as shown, but is three-dimensionally formed, providing a path between the inside and outside of a vacuum device.

A metal having high corrosion resistance, such as nickel or stainless steel, has high hardness. Therefore, increasing the pressure on a metallic gasket material of corresponding hardness, by increasing the number of the bolts 3 so as to increase fastening force, may adversely affect the durability of the vacuum joint parts $2_1$, $2_2$, such as the knife-edge. As a result, the lifetime of the joint is substantially shortened. A thermal treatment, such as annealing, is preferably performed on metal having high corrosion resistance, such as nickel, so as to lower its hardness. Metallic gaskets are put together and/or are carried on a jig during such thermal treatment (e.g., baking). This can leave a flaw at the contact surfaces of the metallic gaskets when the gaskets (or gaskets and jigs) are pulled apart from one another after thermal treatment. Such a flaw has a bad influence on the sealing effectiveness of the metallic gasket.

An object of the present invention is to provide a metallic vacuum gasket and a method for producing it, wherein the gasket has a structure that does not form flaws at the surface that is to provide a sealing face, the gasket being otherwise as described above, thereby solving the production and installation problems mentioned.

SUMMARY OF THE INVENTION

The invention provides a metallic gasket for a vacuum device to be put between vacuum joints for sealing, the gasket being squeezed and deformed by pressure from an abutting portion of said joint. The gasket has a sealing face to be squeezed and deformed by being pressed by said abutting portion, at an area wherein the gasket is thin in a thickness direction compared to a land portion which is not positioned for contact with said abutting portion. The relatively thicker land portion protects the sealing face and prevents formation of a flaw on said sealing face.

According to this aspect, the sealing face is protected by the land portion even if two or more gaskets or a gasket and a jig become stuck together during production, for example during thermal treatment. The sealing face also is protected if the metallic gasket is abutted against other goods or rested on each other in a stack for carrying or storage. The sealing face is protected if a dent or a scratch is formed on a surface of the gasket owing to the intervention of chips. Accordingly, flaws are prevented from being formed, whether by flaking or by contact or by chips. Dents or scratches detracting from airtightness can be avoided.

The metallic gasket can comprise nickel, nickel alloy or stainless steel, with high corrosion resistance and durability suitable for use in a vacuum device under with a highly corrosive atmosphere. Although the malleability of ductility of such materials may be low, and sealing leakage therefore is of concern for the reasons discussed above, the incidence or dent or scratch damage to the sealing face is reduced. Sufficient airtightness is likely to be obtained.

At least the sealing face of the gasket can be plated with gold or silver. When plated with gold or silver and also being comprised of nickel, nickel alloy or stainless steel having high corrosion resistance, the gasket can have even higher corrosion resistance. Airtightness is improved due to the gold coating or silver coating and due to the shape characteristic concerning the protection of the sealing face by the land portion.

For use with a metallic gasket as in FIGS. 1(a) (b), (c) and FIG. 2, for instance, the metallic gasket can seal with a joint part for a vacuum device, the joint part comprising a knife-edge. The metallic gasket shown has a plate shape and on both opposite sides has a sealing face to be engaged by a knife-edge. The sealing face can be formed by a concave groove or a stepped portion, lower than the land portions on each of the opposite sides.

Accordingly, the sealing face on each of the opposite sides of the metallic gasket, which is lower than the land portion, is protected by the land portion from contact other than engagement of the sealing face by the knife edge. A reliably airtight seal can be obtained.

Referring to FIGS. 1(d) and 3, for instance, an abutting portion of one of the joint part that bears on the metallic gasket, and the metallic gasket, can comprise a tapered face. The metallic gasket can have a rectangular or almost rectangular cross section. The portion of rectangular cross section is abutted by a tapered face. The sealing face of the gasket can abut against the tapered face, and in cross section can include a corner portion on the inner diameter side that is obliquely cut off.

The tapered face of the gasket portion abutting on the tapered face of the joint part, namely the sealing face along the corner portion on the inner diameter side that is obliquely cut off, is below the part of the metallic gasket having a section in almost rectangular shape, and therefore is protected. Reliable airtightness is obtained.

Referring to FIG. 4, for instance, a least a portion of the metallic gasket at the sealing face can be formed with rotation cutting streaks having a fine pitch. The rotation cutting streaks can be pressed along the abutting portion on the annular joint side, such as by a knife-edge or a tapered face, the abutting portion squeezing and deforming the projecting portions of the streaks and improving airtight reliability.

The invention also concerns a method for producing a metallic gasket and vacuum seal. See FIG. 5, for instance. The metallic gasket is placed between joint parts of the vacuum device, for sealing with the gasket by being squeezed, deformed or pressed by an abutting portion of said joint parts.

A cutting process can be used to form the sealing face to be squeezed and deformed by pressure from the abutting portion. This process makes the sealing face thin in a thickness direction compared to a thicker land portion. The land portion is a portion of the gasket that is not to be abutted by the abutting portion for making the seal.

A thermal treatment process can be performed, the thermal treatment adjusting a hardness of the gasket in vacuum after the cutting process. The hardness of the metallic gasket can be adjusted to a proper level by heat treatment. Oxidation of the metallic gasket can be inhibited, and gas included in the gasket material can be removed, if the heat treatment is performed in vacuum. This improves the effectiveness of the metallic gasket. Inasmuch as the cutting process is performed before the heat treatment process, the hardness of the gasket can be made adjusted to the proper hardness by subsequent heat processing even if the surface of the gasket was hardened as a result of the by the cutting machining operation.

Even if two or more metallic gaskets are stuck together, or if a metallic gasket and a jig are stuck together by baking during the heat treatment process, the affected portion is the land portion. Baked portions may peel or be flaked off with a tool. Flaws formed by the appliance or by a tool when peeling off portions occur on the land portion. The sealing face is protected and kept without flaws. Whereas the sealing face is protected from flaws but nevertheless has been adjusted for hardness by the heat treatment, the resulting metallic gasket has high sealing efficiency and superior reliability.

More particularly, the method comprises producing the metallic gasket of nickel, and adjusting the hardness of the metallic gasket to a Vickers hardness 75 to 95 Hv by annealing in said heat treatment process. The nickel metallic gasket is softened by annealing in the heat treatment process so as to have Vickers hardness 75 to 95 Hv. As a result, the fastening force needed between the joint parts and the gasket for the vacuum device is reduced while obtaining a sufficient sealing function and corrosion resistance. Thus the process does not detract from the lifetime of the joint.

In another embodiment the metallic gasket is made of stainless steel. The hardness of said metallic gasket is adjusted to Vickers hardness 120 to 180 Hv by annealing in said heat treatment process. Stainless steel has high corrosion resistance and is relatively inexpensive. The gasket is softened by annealing in a heat treatment process so as to get a Vickers hardness 120 to 180 Hv. The result is a metallic gasket having corrosion resistance which is practical and inexpensive.

DESCRIPTION OF THE PREFERRED EMBODIMENTS

Figure 1:
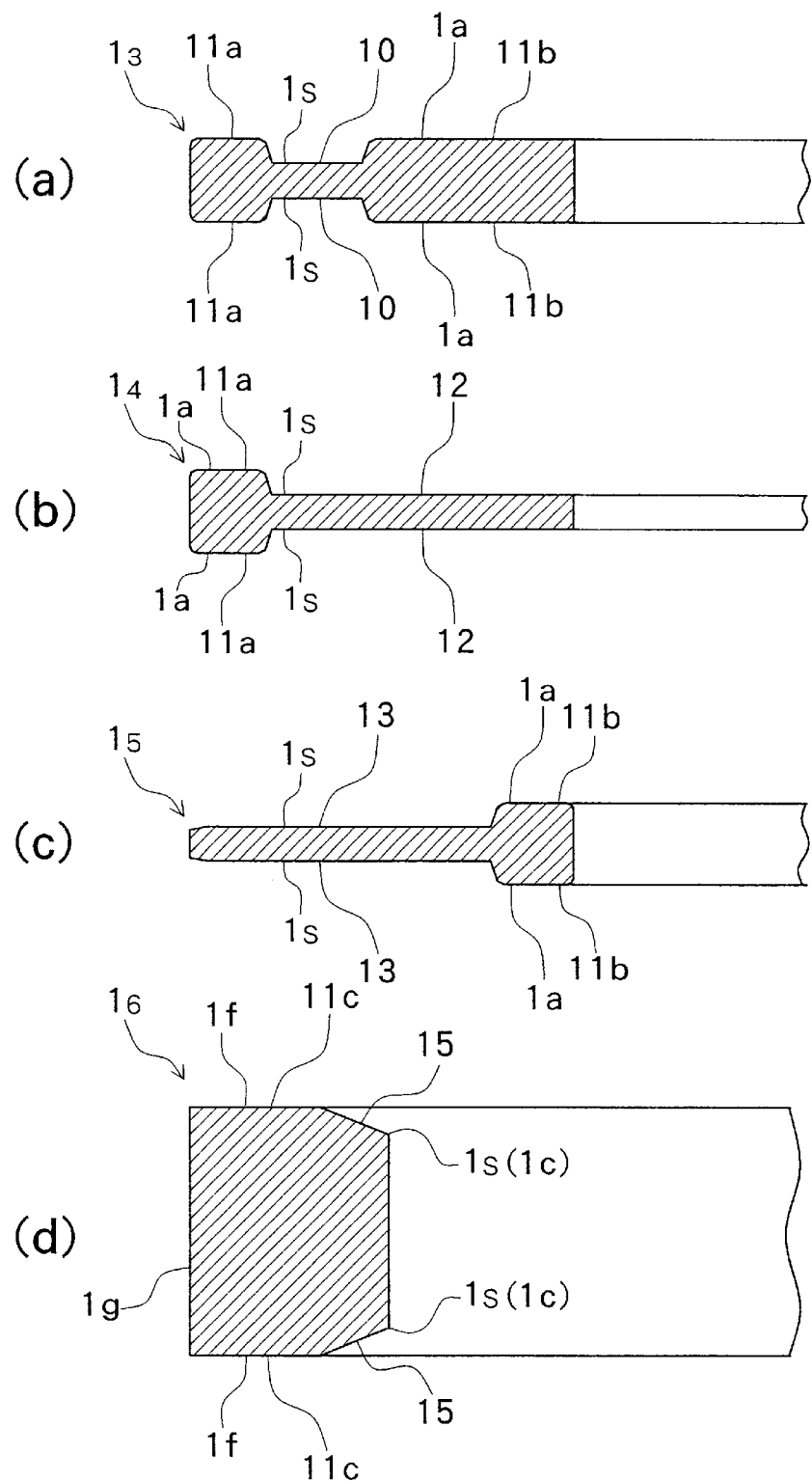
FIGS. 1(a) to 1(d) show respective sectional views of different embodiments of metallic gaskets according to the invention in different shapes.
Figure 2:
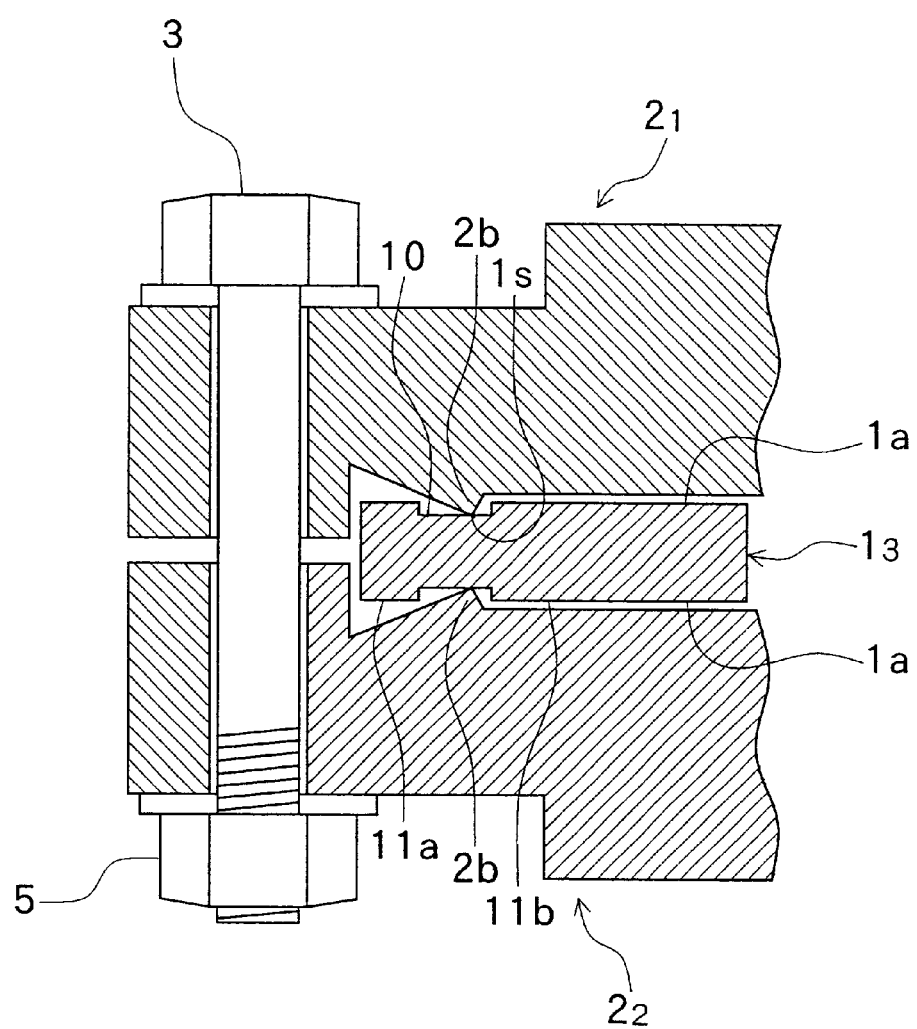
FIG. 2 is a partial section view showing the metallic gasket of one embodiment of the invention, the gasket being in the shape of a plate, applied to a vacuum joint.
Figure 3:
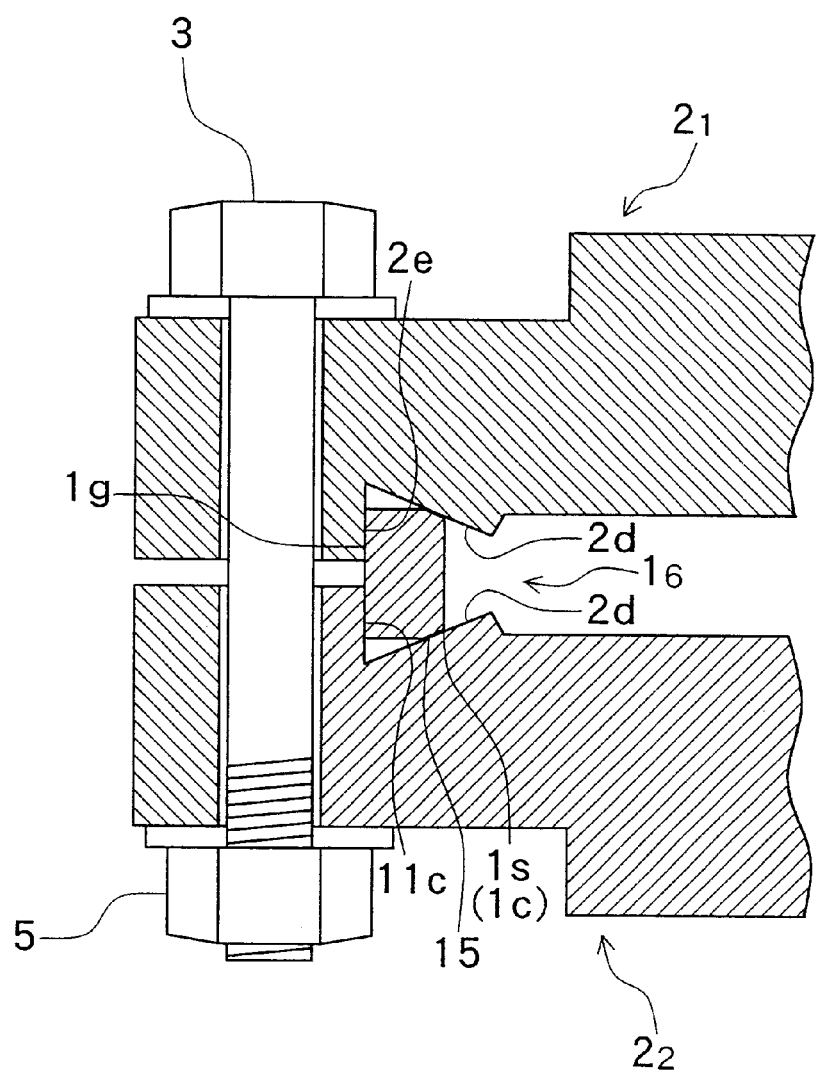
FIG. 3 is a partial section view showing the metallic gasket of another embodiment in which the gasket has a section in the shape of a rectangle, likewise applied to a vacuum joint.

Embodiments of the invention will now be explained, referring to the drawings. FIGS. 1(a) through 1(c) are views showing a section of a metallic gasket in a plate shape, to be sealed by engagement with a knife-edge. FIG. 1(d) relates to a rectangular sectional shape, to be sealed by a tapered face. FIG. 2 shows the inventive joint employing the gasket with knife edge as in FIGS. 1(a to 1(c). FIG. 3 shows the inventive joint employing the tapered face gasket. Each of these embodiments can be annularly formed, i.e., round as seen from their top.

Figure 7:
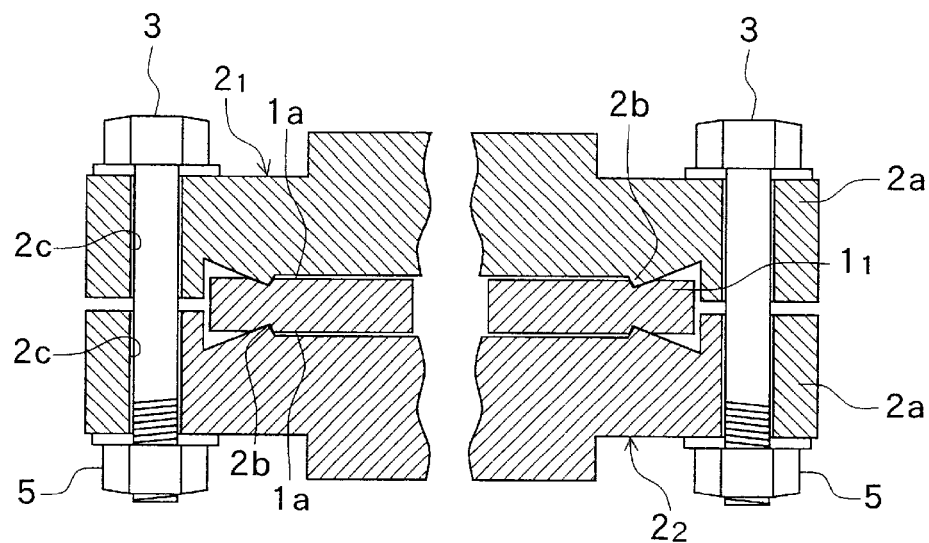
FIGS. 7(a) and 7(b) are partial section views showing two forms of vacuum joints using conventional metallic gaskets in the shape of a plate and in the sectional shape of a rectangle.
Figure 7:
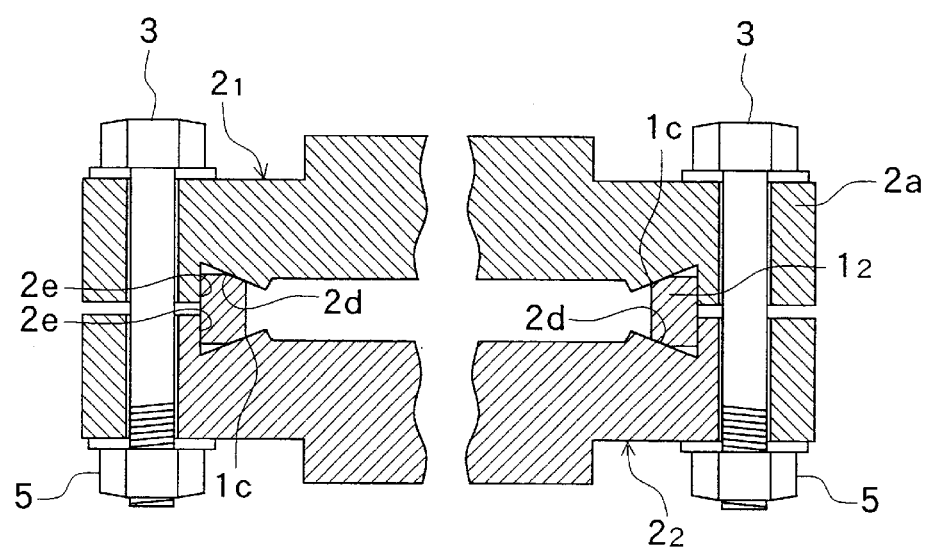
Figure 8:
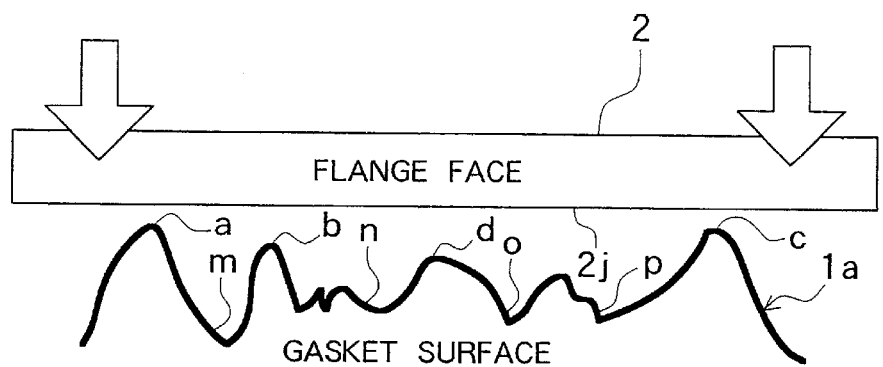
FIGS. 8(a)–8(c) are enlarged views showing typical relations between a surface of the gasket and a flange face of the joint; 8(a) shows the surface of the gasket and the flange face apart from each other; 8(b) shows a gasket made of oxygen free copper pressed on the flange face; and 8(c) shows a comparable state of a gasket made of nickel or stainless steel is pressed on the flange face.
Figure 8:
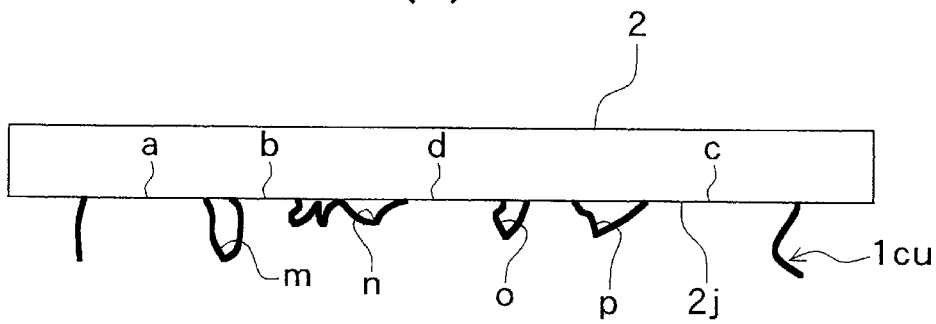
Figure 8:
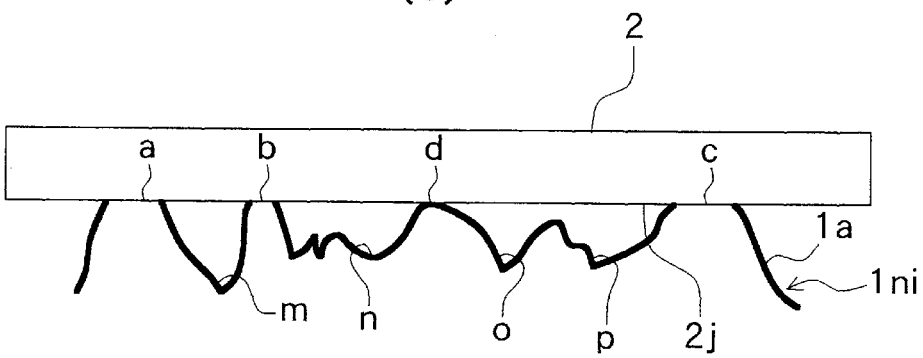
Figure 9:
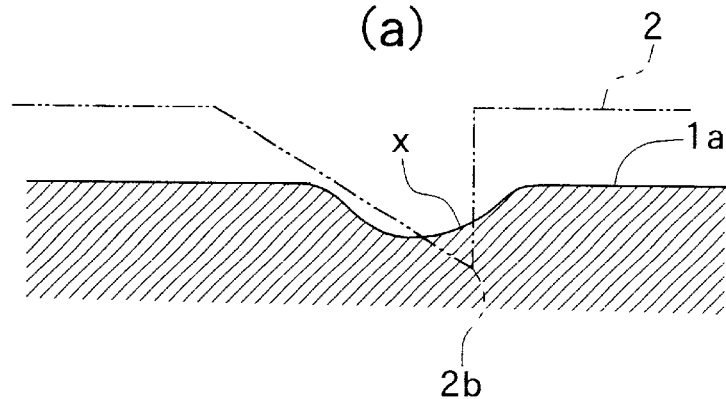
FIGS. 9(a)–9(c) show typical relations between a sealing face and the knife-edge when flaws are formed on the gasket, 9(a) being an enlarged view for showing the sealing face of the gasket; 9(b) being an enlarged view for showing a case of the gasket made of oxygen free copper; and 9(c) being an enlarged view for showing a case of the gasket made of nickel or stainless steel.
Figure 9:
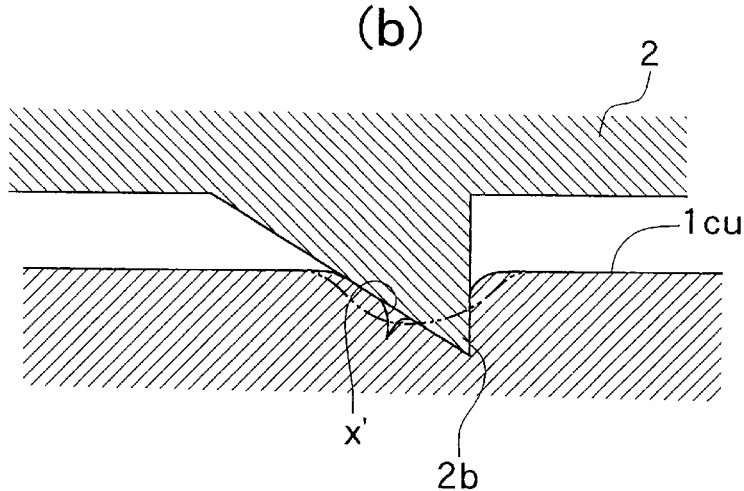
Figure 9:
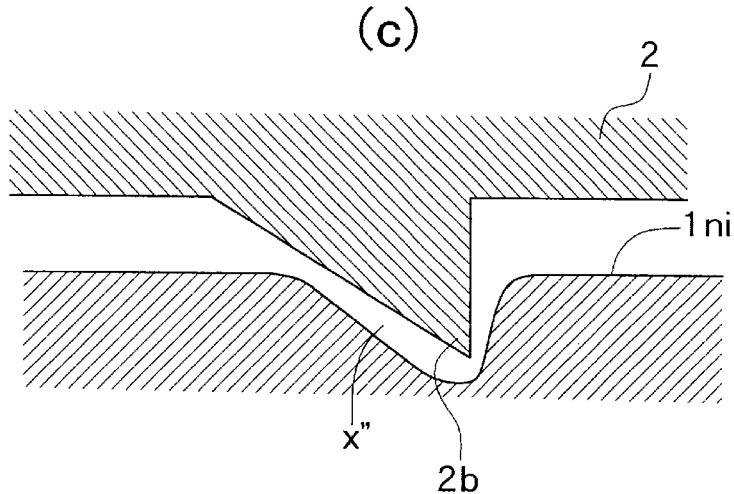

The metallic gaskets as shown in FIGS. 1(a) through 1(c) relate to a gasket in the shape of a plate having opposite sides 1a, 1a comprised of flat faces. However the flat faces are not continuous as in conventional gasket plate $1_1$ shown in FIG. 7(a). In a metallic gasket $1_3$ as shown in FIG. 1(a), a sealing face 1s, to be engaged by a knife-edge, is formed as a concave groove 10 by turning cutting machining. The concave grooves 10 of both sides have a structure that is stepwise lower in comparison with the land portions 11a, 11b that are provided on both opposite sides, adjacent to the grooves 10 in a diameter direction. The land portions are not deeply cut, that is, the grooves 10 are thinner in the thickness direction than the lands 11a, 11b.

A metallic gasket $1_4$ as shown in FIG. 1(b) is formed such that both sides 1a, 1a at the outside diameter are left thick so as to form the land portions 11a. The inner diameter including the sealing face 1s is cut by rotation cutting machining so as to form a structure one step lower than the land portion. At this lower stepped portion 12 along the inner diameter, the gasket is thinner in the thickness direction than the annular land portions 11a at the outer diameter edge, comprised of both sides 1a, 1a. In contrast to FIG. 1(b), a metallic gasket 15 as shown in FIG. 1(c) is formed in such a manner that both opposite sides 1a, 1a at the inner diameter are left thick so as to be land portions 11b. The outer diameter including the sealing face 1s is cut by rotation cutting machining so as to form a stepped structure 13, stepwise lower than the land portion. The stepped lower portion 13 at the outer diameter has a structure that is thin in the thickness direction as compared to the annular land portions 11b at the inner diameter on both sides 1a, 1a.

A metallic gasket $1_6$ as shown in FIG. 1(d) has a section in the shape of a rectangle. In this gasket, the corner portion on the inner diameter side 1c is engaged on a tapered face so as to become a sealing face (see $1_2$ of FIG. 7(b) which shows a conventional gasket). A portion 15 including the corner portion 1c which becomes the sealing face is obliquely cut off by the rotation cutting machining. This portion 15 has a structure that is thin in the thickness direction with respect to land portions 11c on both opposite sides 1f, 1f.

The metallic gaskets $1_3$ through $1_6$ in the embodiments shown in FIGS. 1(a)–(d) can be formed of nickel, nickel alloy or stainless steel. If nickel, pure nickel is preferred for the gasket member, i.e., wherein the amount of impurity is relatively small. Nickel alloy may suffice. If a nickel alloy is used, inconel (Registered Trademark) is most preferable, secondly incoloy (Registered Trademark), and thirdly monel (Registered Trademark). If stainless steel, SUS or JIS, of number three hundred and more, and less than four hundred, is preferable. The material is preferably non magnetic, corrosion resistant, weldable, processable, and has acceptable gas evolution characteristics and the like. Alternatively, austenitic stainless steel may be applicable.

Figure 5:
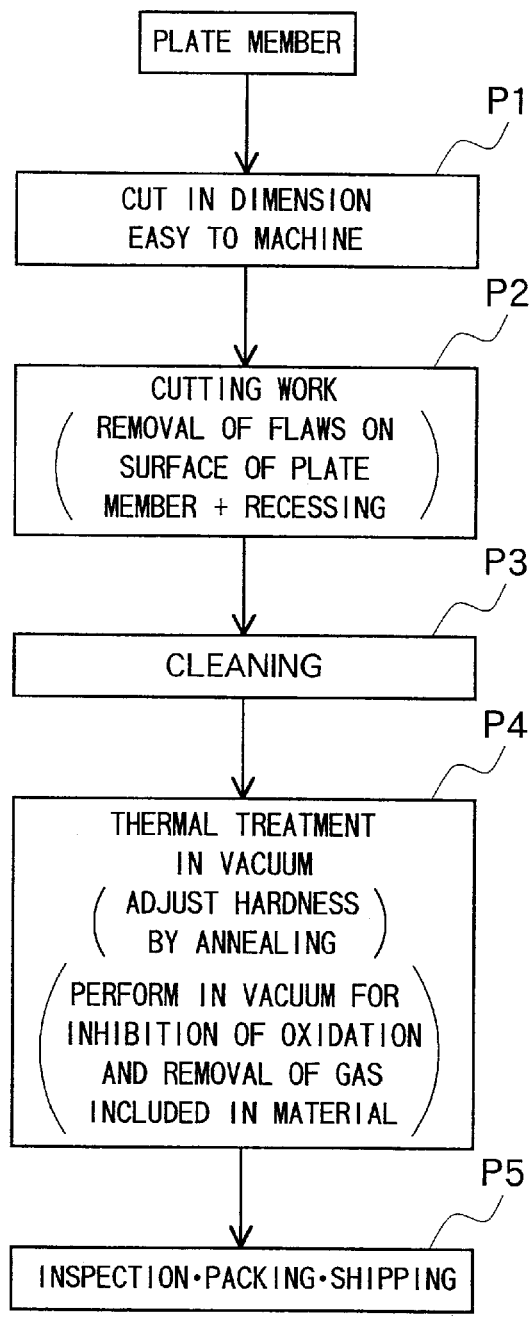
FIG. 5 is a flow chart showing a method of producing the metallic gasket according to the invention.

A method of producing the metallic gaskets $1_3$ through $1_6$ will now be explained, referring to FIG. 5. Firstly, a nickel plate or a stainless plate having a predetermined thickness is provided, or a plate member is formed by processing a round bar or pipe member. Generally, annealing has already been performed if the material is pure nickel plate as sold on the market. The nickel plate is softened to 120 to 150 Hv. Stainless steel has Vickers hardness of 300 Hv or so.

Figure 4:
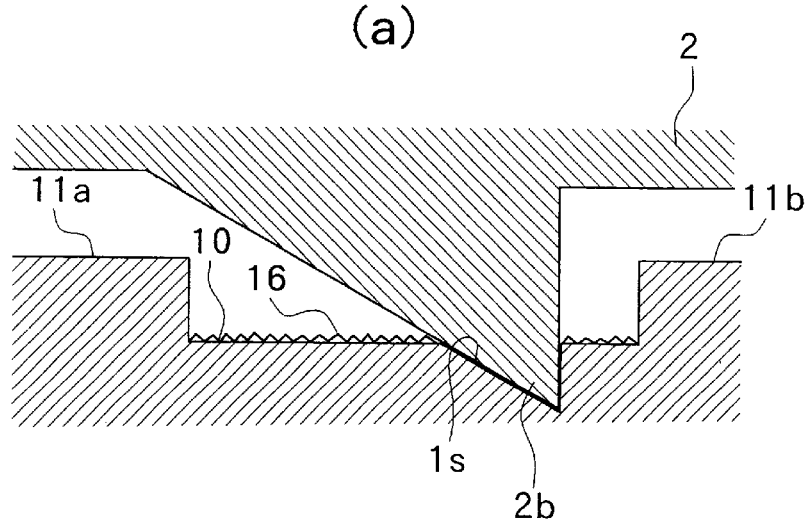
FIGS. 4(a) and 4(b) are enlarged section views showing sealed portions, 4(a) being a sectional view of a concave groove portion sealed by a knife-edge and 4(b) being a sectional view of a cut off portion sealed by a tapered face.
Figure 4:
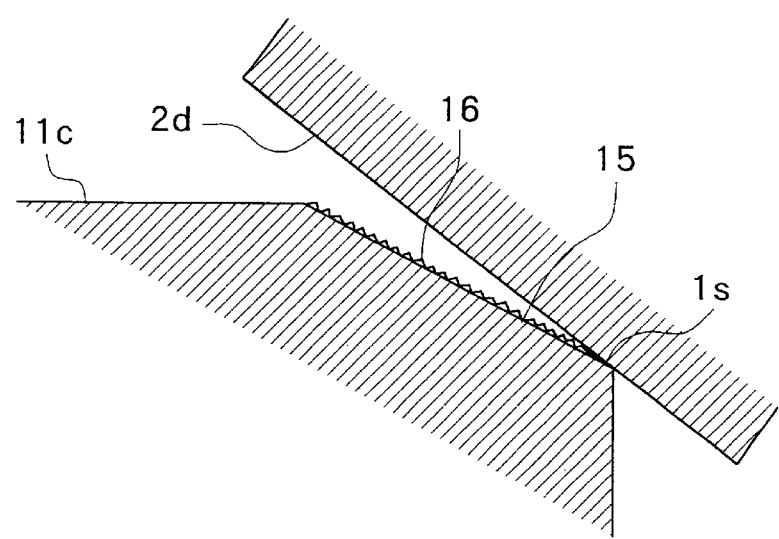

The above-mentioned plate member is rough cut to a dimension making it easy to machine into a metallic gasket (cutting process P1). Part of the plate member is then cut on its surface using a turning cutting machine, such as a lathe (cutting process P2). To be more precise, in order to produce metallic gaskets $1_3$ through $1_6$ shown in FIG. 1, cutting machining (turning cutting machining) is performed on both opposite sides with a lathe, so as to remove flaws on the surface of the plate member. In certain circumstances, grinding machining is performed, and furthermore, polishing machining can be performed such that the surface has a smooth or even mirror-like face. Furthermore, cutting machining is performed with a lathe on the piece of the plate member which surface is cut so as to form the concave groove 10 (FIG. 1(a)), the stepped portion 12 on the inside diameter side (FIG. 1(b)), the stepped portion 13 on the outside diameter side (FIG. 1(c)) and the cut off portion 15 (FIG. 1(d)). In the final part of the cutting process (P2), streaks 16 are formed in these concave grooves having a thin pitch. The stepped portion and the cutting off portion are made by making feed speed and depth of cut changes with the cutting tool of a small size, as shown in FIGS. 4(a) and (b). The streak 16 can be formed in the shape of a spiral (if seen from above in FIG. 4(a) and from the right in FIG. 4(b)).

Since the metallic gaskets $1_3$ through $1_6$ are formed by a turning cutting machining with a lathe, one by one, the finished gaskets are placed on a rest next to the lathe after cutting, or the gaskets may be piled on one another for transportation and storage. If so, the machined gaskets are abutted on the product rest or against each other. Dents may be formed on the sides 1a and 1f due to such abutment between metal surfaces. Chips or the like can intervene on the rest or between the products, causing scratches on the surface.

The cut metallic gasket material is cleaned after machining (cleaning process P3), and then placed in a vacuum vessel. The gasket material is heated to a predetermined temperature so as to perform thermal treatment, such as annealing (thermal treatment process P4). The thermal treatment in vacuum is for prevention of oxidation of the metallic gasket material under high temperature circumstances and also removes gas from the material. The nickel is softened so as to have Vickers hardness of 75 through 95 Hv, preferably 80 through 89 Hv (80 level) by such annealing. In the case of stainless steel, the material is softened so as to have Vickers hardness of 120 through 180 Hv. Hardness 80 through 89 Hv is preferable for a sealing member, but in stainless steel, coarsening may arise if the material is softened to that hardness rating. Therefore, a stainless steel hardness of 120 through 130 Hv is preferable, as a tradeoff taking the crystal grain into consideration.

After thermal treatment, the metallic gasket is inspected, packed and shipped (P5). Since the thermal treatment process P4 is executed after the cutting process P2, as explained above, the lower hardness rating due to thermal treatment is maintained in the metallic gasket. This order of processing is preferred because otherwise the material that has been softened by thermal treatment would be hardened again by subsequent cutting machining.

Next, embodiments of the thermal treatment process will be explained.

Embodiment 1

Figure 6:
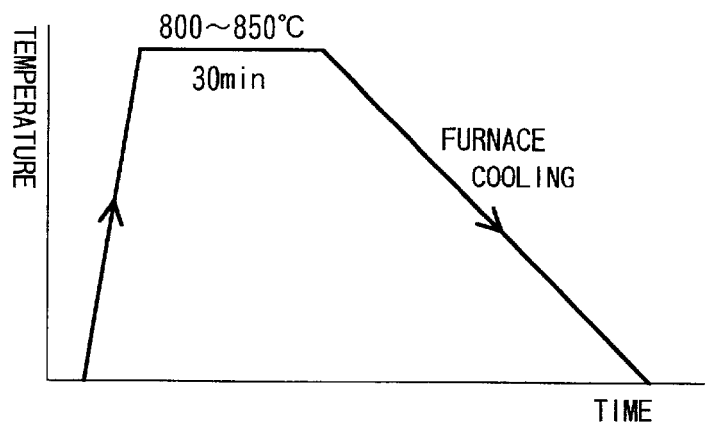
FIGS. 6(a) and 6(b) are time-temperature plots showing two different routines of thermal treatment.
Figure 6:
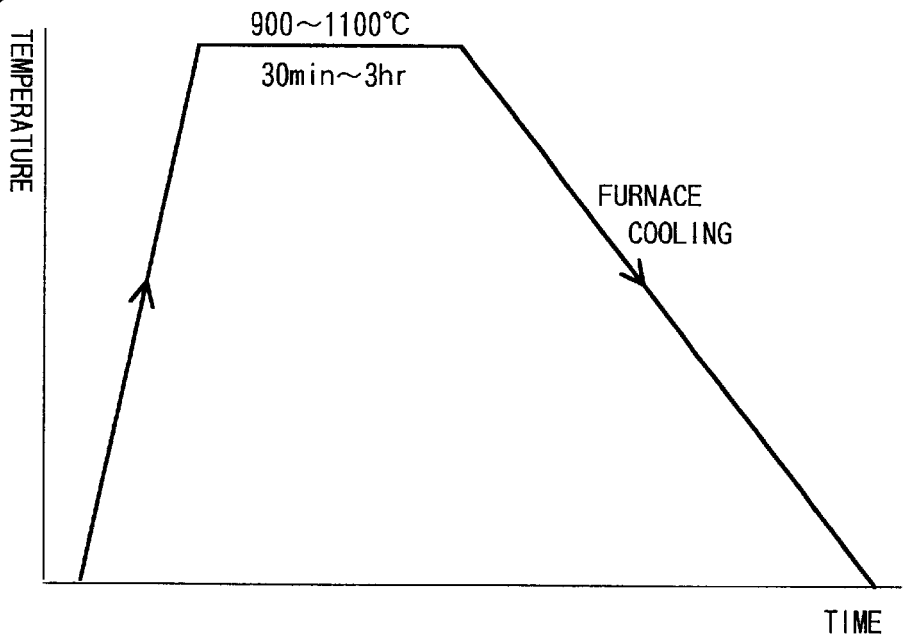

Metallic gasket material: Nickel (Ni 99.0% pure, 1% impurity)
Degree of Vacuum: $10^{-4}$–$10^{-6}$ Torr, preferably, the level of $10^{-4}$ Torr or lower
Thermal treatment: Temperature is increased to 700 to 850° C., which is maintained thirty minutes followed by cooling in the furnace (see FIG. 6(a)). In this technique, the high temperature is held for thirty minutes or so, and the temperature falls over three to five hours or so. These specifications are variable with the size of a furnace (heat capacity) and the quantity of goods to be processed. If the temperature is 250° C. or lower, the goods can be taken out of a furnace so as to anneal in the air.

If the temperature is increased above 850° C. or more, the crystal grain can becomes large due to recrystallization, which detracts from sealing efficiency and corrosion resistance. If the temperature remains at 700° C. or less, softening of the Ni material is insufficient.

Embodiment 2

Metallic gasket material: 18–8 stainless steel (SUS316L, SUS304L, these model numbers are based on Japanese Industrial Standard (JIS)).
Degree of Vacuum: $10^{-4}$–$10^{-6}$ Torr, preferably, the level of $10^{-4}$ Torr or lower
Thermal treatment: Temperature is increased to 900 to 1100° C. and is held thirty minutes, then the material is held to cool three hours in a furnace (see FIG. 6(b)). This technique is similar to the above-mentioned embodiment 1, but the cooling time may take one hour or so longer because the maximum process temperature is higher than with the Ni processing technique.

If the temperature is increased to 1100° C. or more, the crystal grain may becomes large due to recrystallization, detracting from sealing efficiency and corrosion resistance. If the temperature is 900° C. or lower, softening of the SUS material is insufficient.

The above-mentioned thermal treatment process can be performed after piling the metallic gasket materials on one another in a vacuum vessel, or after arranging them on a jig. When the temperature of the metallic gasket material is increased, the material of piled gaskets, or the material where a gasket touches the jig, may become stuck together from the baking. The piled metallic gaskets or the metallic gaskets and the jig, which are stuck together, are separated from each other with a tool, such as a driver. Flaws can be formed on the metallic gaskets by such baking and subsequent separation, namely on the surfaces that abut against each other when the metallic gasket materials are piled on each other, or abut the surface of the jig. The flaws occur on land portions 11a, 11b, 11c and not on the sealing face 1s.

Although flaws are formed on the metallic gaskets $1_3$ through $1_6$, such as dents, scratches, baking or peeling off flaws and the like, the flaws are formed on the land portions 11a, 11b, 11c that make contact with the product rest or the jig, or the land portions of other such gaskets that make contact during the process. The concave groove 10, below the stepped portions 12, 13, as well as the cut off portion 15, in either case including the sealing face 1s, are protected by the land portions. These parts that are thin in the thickness direction are protected because only the land portions make contact with the product rest or the jig or one another. The concave groove, the stepped portion and the cut off portion are protected from contact that might causes flaws such as scratches and dents.

In the shapes of the gaskets $1_3$ through $1_6$ as shown in FIGS. 1(a), (b), (c) and (d), the surfaces including the sealing face 1s are protected by the land portions. As to the extent of such protection, the gasket $1_3$ of FIG. 1(a) is most protective, followed by the gasket $1_6$ of FIG. 1(d), gasket $1_4$ of FIG. 1(b) and gasket $1_5$ of FIG. 1(c), in order.

The metallic gaskets $1_3$ through $1_6$ are used for achieving a vacuum joint between joint elements $2_1$, $2_2$ (a bakable flange having a knife-edges) in a manner similar to conventional joints. The gasket (e.g., gasket $1_3$ in FIG. 2) is put between both joint parts $2_1$, $2_2$ so as to position a knife-edge 2b in the concave groove 10 so as to engage against sealing face 1s. Several bolts 3 and nuts 5 are then tightened until the knife-edge 2b bites into the sealing face 1s. The tightening is applied on both sides so as to seal and connect the joint parts on both sides to each other through the gasket. According to the invention, the sealing face $1s$ of the gasket $1_3$, which can be made of material wherein spreading is low compared to conventional copper, such as nickel, nickel alloy and stainless steel, is placed in a concave groove 10 that is protected by the land portions 11a, 11b. In the absence of a scratch or dent, both joints can be sealed airtight.

In a similar way, the gasket $1_6$ as shown in FIG. 1(d) is put between both joints $2_1$, $2_2$ so as to position the cut off portion 15 including its sealing face $1s$ at a tapered face $2d$, shown in FIG. 3. As above, bolts 3 and nuts 5 are fastened such that an outer diameter side $1g$ of the gasket $1_6$ abuts against a vertical face $2e$ of the joint, and the sealing face $1s$ is squeezed by the tapered face $2d$. Accordingly, both joints are sealed and connected with each other. In this case, the sealing face $1s$ of the gasket $1_6$ which can be made of material wherein spreading is low, such as nickel, is placed such that the cut off portion 15 is protected against contact by the land portions 11c, 11c and against scratches and dents. Again, both joints can be sealed airtight.

Furthermore, the concave groove 10 (the stepped portions 12, 13 are also similar) and the cut off portion 15 including the sealing face $1s$ can comprise streaks 16 having a fine pitch in the shape of almost concentric circles (or more precisely, a spiral), as shown in FIG. 4(a) and (b). The annular knife-edges $2b$ and (the abutting portion of) the tapered face $2d$ are pressed against the gaskets along the streaks. The projecting peaks of the streaks in the shape of almost concentric circles are relatively easily squeezed and deformed by pressure along the knife-edge and/or along the abutting portion of the tapered face. Even if small flaws are formed, the flaws are compensated by the projecting portions of the streaks 16 so as to certainly seal.

The metallic gaskets $1_3$ through $1_6$ can be comprised of material wherein corrosion resistance is high, such as nickel, nickel alloy or stainless steel. Even if a vacuum device is used under the atmosphere of high corrosion resistance, such as halogen, $NF_3$ gas, or free hydrogen, the gasket is sufficiently durable. Assuming that the gasket is comprised of corrosion resistant material, such as nickel and stainless steel, thermal treatment is performed after the cutting process, and the gasket is maintained at the predetermined lower hardness level achieved by the thermal softening process. Even if the pressing force on the gasket by fastening of the bolts 3 and the nuts 5 is relatively low, the knife-edge $2b$ and the tapered face $2d$ bite into the sealing face $1s$ of the gasket with high sealing efficiency and reduced damage to the knife-edge $2b$ and the tapered face $2d$ of the joints $2_1$ and $2_2$, thus improving the durability of the joint $2_1$ and $2_2$.

Certain shapes of the metallic gasket are shown in FIGS. 1(a), (b), (c) and (d) in the above-mentioned embodiments. These shapes are not limiting, and other shapes are possible so long as the portion which is used as the sealing face is lower than the nearby land portions (i.e., thin in the thickness direction). Additionally, the present embodiments employ certain materials for the metallic gasket, such as nickel, nickel alloy and stainless steel. These materials are not limiting, and other materials are possible, not limited to materials where corrosion resistance is high or spreading is low, etc.

The metallic gasket as formed with the above-mentioned materials and shapes, including the whole surface or only the concave groove, the stepped portion or the cutting off portion including the sealing face, may be plated with gold or silver so that the plating width is more or less thick. It is not necessary to plate the whole gasket with gold or silver, which is expensive. The corrosion resistance and sealing efficiency are further improved by the combination of the effects of the characteristics of gold or silver plating and the gasket shape characteristic that reduces or eliminates the instance of flaws on the sealing faces protected by the land portions.

The invention has been explained on the basis of the embodiments heretofore, which are illustrative and not limiting. The scope of the invention is defined by the accompanying claims and is not restricted to the foregoing descriptions of specific embodiments. Accordingly, all variations within the scope of the claims are included in the scope of the present invention.

What is claimed is:

1. A metallic gasket to be used for sealing between joint parts of a vacuum device, wherein the metallic gasket is to be squeezed and deformed by engagement along an abutting edge of one of said joint parts, the gasket comprising:

a sealing face on the gasket, the sealing face being positioned for engagement with the abutting edge of said one of the joint parts, the sealing face forming a surface prepared to receive the abutting edge, and the sealing face having a thickness in a thickness direction;

a land portion on the gasket, the land portion being located one of inside or outside of the gasket relative to the sealing face, the land portion being placed clear of engagement with the abutting edge of the joint part;

wherein the land portion has a thickness in the thickness direction that is greater than the thickness of the sealing face;

whereby the surface to receive the abutting edge is protected from contact prior to said engagement with said one of the joint parts.

2. The metallic gasket according to claim 1, wherein said metallic gasket comprises one of nickel, nickel alloy and stainless steel.

3. The metallic gasket according to claim 1, wherein said metallic gasket comprises one of nickel, nickel alloy and stainless steel, and wherein at least said surface to receive the abutting edge of the joint part is plated with one of gold and silver.

4. The metallic gasket according to claim 1, wherein at least the surface of the sealing face to receive the abutting edge is formed with rotation cutting streaks having a pine pitch.

5. In combination, a metallic gasket and a joint part of a vacuum device for sealing with the metallic gasket, wherein the metallic gasket is to be squeezed and deformed by engagement along an abutting edge of the joint part, the combination comprising:

the gasket having a sealing face positioned for engagement with the abutting edge of said one of the joint parts, the sealing face forming a surface prepared to receive the abutting edge before engagement along the abutting edge, and the sealing face having a thickness in a thickness direction;

a land portion on the gasket, the land portion being located one of inside or outside of the gasket relative to the sealing face, the land portion being placed clear of engagement with the abutting edge of the joint part;

wherein the land portion has a thickness in the thickness direction that is greater than the thickness of the sealing face;

whereby the surface to receive the abutting edge is protected from contact prior to said engagement with said one of the joint parts; and, wherein the abutting portion of said joint part comprises a knife-edge, said metallic gasket has a plate shape having opposite sides, and said surface of the sealing face for receiving the abutting portion including sealing face surfaces on both opposite side faces of the gasket, each formed by one of a concave groove and a stepped portion that is lower than an associated part of said land portion one each of the opposite sides.

6. In combination, a metallic gasket and a joint part of a vacuum device for sealing with the metallic gasket, wherein the metallic gasket is to be squeezed and deformed by engagement along an abutting edge of the joint part, the combination comprising:

the gasket having a sealing face positioned for engagement with the abutting edge of said one of the joint parts, the sealing face forming a surface prepared to receive the abutting edge before engagement along the abutting edge, and the sealing face having a thickness in a thickness direction;

a land portion on the gasket, the land portion being located outside of the gasket relative to the sealing face, the land portion being placed clear of engagement with the abutting edge of the joint part; and, wherein the abutting edge of said joint part of said vacuum device comprises a tapered face, said metallic gasket has an almost rectangular section, and a portion of the gasket to receive the abutting edge is formed by obliquely cutting off a corner portion on an inner diameter side of said almost rectangular section.

* * * * *